US009498719B2

(12) United States Patent
Takeuchi

(10) Patent No.: US 9,498,719 B2
(45) Date of Patent: Nov. 22, 2016

(54) GAME SYSTEM, CONTROL METHOD FOR GAME SYSTEM, AND PROGRAM

(71) Applicant: GREE, INC., Tokyo (JP)

(72) Inventor: Masaru Takeuchi, Tokyo (JP)

(73) Assignee: GREE, INC., Tokyo (JP)

( * ) Notice: Subject to any disclaimer, the term of this patent is extended or adjusted under 35 U.S.C. 154(b) by 104 days.

(21) Appl. No.: 14/229,328

(22) Filed: Mar. 28, 2014

(65) Prior Publication Data

US 2014/0295964 A1    Oct. 2, 2014

(30) Foreign Application Priority Data

Mar. 29, 2013  (JP) ................................. 2013-073429

(51) Int. Cl.
| | |
|---|---|
| A63F 9/00 | (2006.01) |
| A63F 13/58 | (2014.01) |
| A63F 13/335 | (2014.01) |
| A63F 13/833 | (2014.01) |

(52) U.S. Cl.
CPC ............. *A63F 13/58* (2014.09); *A63F 13/335* (2014.09); *A63F 13/833* (2014.09)

(58) Field of Classification Search
CPC .................... A63F 13/335; A63F 13/58; A63F 13/833
See application file for complete search history.

(56) References Cited

U.S. PATENT DOCUMENTS

| | | | | |
|---|---|---|---|---|
| 6,375,566 B1* | 4/2002 | Yamada | .................... | A63F 1/00 273/308 |
| 6,398,651 B1* | 6/2002 | Yamada | .................... | A63F 1/00 463/1 |
| 6,419,584 B1* | 7/2002 | Sakamoto | ............. | A63F 13/005 463/43 |
| 8,905,839 B1* | 12/2014 | Watanuki | .............. | G07F 17/329 463/23 |
| 2003/0171142 A1* | 9/2003 | Kaji | .......................... | A63F 1/02 463/11 |

(Continued)

FOREIGN PATENT DOCUMENTS

| | | |
|---|---|---|
| JP | 2006-95334 A | 4/2006 |
| JP | 2008-220984 A | 9/2008 |

(Continued)

OTHER PUBLICATIONS

Japanese Office action mailed Mar. 17, 2015 in corresponding Japanese Patent Application No. 2013-073429, including English translation, 7pp.

(Continued)

*Primary Examiner* — Seng H Lim
(74) *Attorney, Agent, or Firm* — Lewis Roca Rothgerber Christie LLP

(57) ABSTRACT

A game system, a control method for a game system, and a program that enable strategic arrangement of a deck which is an object set are provided. A method according to the invention is a method for controlling a device for providing a game of fighting an enemy character, the method comprising: a step of arranging a plurality of objects according to selection by a user; and a step of executing an operation against the enemy character, by changing the arrangement of the plurality of objects.

9 Claims, 17 Drawing Sheets

(56) References Cited

U.S. PATENT DOCUMENTS

| | | | | | |
|---|---|---|---|---|---|
| 2008/0153562 | A1* | 6/2008 | Ohara | | A63F 1/04 463/16 |
| 2009/0305759 | A1* | 12/2009 | Nishimura | | A63F 13/00 463/9 |
| 2010/0156048 | A1* | 6/2010 | Gress | | A63F 9/00 273/308 |
| 2011/0218041 | A1* | 9/2011 | Itami | | A63F 13/10 463/31 |
| 2012/0064969 | A1* | 3/2012 | Uchibori | | A63F 13/12 463/29 |
| 2013/0260881 | A1* | 10/2013 | Nonaka | | A63F 13/00 463/29 |
| 2014/0066199 | A1* | 3/2014 | Takagi | | A63F 13/35 463/31 |
| 2014/0080595 | A1* | 3/2014 | Suga | | A63F 13/10 463/31 |
| 2014/0080599 | A1* | 3/2014 | Shimono | | A63F 13/00 463/31 |
| 2014/0094317 | A1* | 4/2014 | Takagi | | A63F 13/12 463/42 |
| 2014/0121026 | A1* | 5/2014 | Hashimoto | | A63F 13/12 463/42 |
| 2014/0295937 | A1* | 10/2014 | Takahashi | | G07F 17/326 463/20 |
| 2014/0295938 | A1* | 10/2014 | Takahashi | | G07F 17/326 463/20 |

FOREIGN PATENT DOCUMENTS

| | | |
|---|---|---|
| JP | 2009-207625 A | 9/2009 |
| JP | 2013-48652 A | 3/2013 |

OTHER PUBLICATIONS

Final Rejection issued in corresponding Japanese Patent Application No. 2013-073429, mailed Jun. 9, 2015, including English translation, 6pp.

Report of Pretrial ReExamination dated Nov. 6, 2015 for corresponding JP Application No. 2013-073429, including English translation 4pp.

* cited by examiner

FIG. 4

| USER ID | PASSWORD | HISTORY INFORMATION | | | | |
|---|---|---|---|---|---|---|
| | | Lv | STATUS | PLAY TIME | ACQUIRED ITEM | ... |
| UID000001 | Yr98AB77 | 45 | LOGIN | 156:45:16 | ID0003, ID0006 | ... |
| ⋮ | ⋮ | ⋮ | ⋮ | ⋮ | | ⋮ |

FIG. 5

| CARD ID | CARD NAME | ATTR-IBUTE | HP | OFFENSIVE POWER | DEFENSIVE POWER | RARITY |
|---------|-----------|------------|-----|-----------------|-----------------|--------|
| CID00001 | Xxxxxx | WATER | 300 | 150 | 120 | SS |
| ⋮ | ⋮ | ⋮ | ⋮ | ⋮ | ⋮ | ⋮ |

FIG. 6

| USER ID | DECK ID | INITIAL POSITION ||||||||| 
| | | 1 | 2 | 3 | 4 | 5 | 6 | 7 | 8 | 9 |
|---------|---------|---|---|---|---|---|---|---|---|---|
| UID000001 | DID001 | CID123 | CID156 | CID223 | CID881 | CID001 | CID109 | CID385 | CID668 | CID333 |
| UID000001 | DID002 | CID356 | CID226 | CID879 | CID633 | CID225 | CID165 | CID223 | CID255 | CID012 |
| UID000002 | DID056 | CID003 | CID820 | CID608 | CID241 | CID287 | CID459 | CID325 | CID112 | CID012 |
| ⋮ | ⋮ | ⋮ | ⋮ | ⋮ | ⋮ | ⋮ | ⋮ | ⋮ | ⋮ | ⋮ | ly a part of the polyhedron may be dis-
GAME SYSTEM, CONTROL METHOD FOR GAME SYSTEM, AND PROGRAM

CROSS REFERENCE TO RELATED APPLICATION

This application claims the priority of Japanese Patent Application No. 2013-073429, filed Mar. 29, 2013, which is incorporated herein by reference in its entirety.

BACKGROUND

Disclosed herein is a game system, a control method for a game system, and a program.

Conventionally, there are many techniques relating to game systems for providing games of fighting using cards possessed by users. For example, JP2008-220984A discloses a technique relating to a game device for fighting a battle using a deck that is formed by a predetermined number of cards. The game device includes control means for outputting, as advice, a deck evaluation message evaluating a deck selected by a game player.

SUMMARY

However, in conventional techniques as in the game device in JP2008-220984A, even when the user acquires a plurality of types of cards, the number of cards that can be arranged in the deck and used for fighting is limited, which may decrease the user's interest in the game. Besides, the arrangement of the deck is merely intended to select cards used for fighting, and no strategic characteristics can be attached to the arrangement positions.

In view of the above-mentioned circumstances, an object of various embodiments of the present invention is providing a game system, a control method for a game system, and a program that enable strategic arrangement of a deck which is an object set.

A method according to the invention is a method for controlling a device for providing a game of fighting an enemy character, the method comprising: a step of arranging a plurality of objects according to selection by a user; and a step of executing an operation against the enemy character, by changing the arrangement of the plurality of objects.

The term "game system" means a system including an information processing device and the like and for providing a specific function to a user. For example, the game system includes, but is not limited to, a server device, a cloud computing system, an ASP (Application Service Provider), a client-server model, or the like.

The term "object" means an element used in a game and visible to a user. The object is desirably a card or the like, though not limited to such. Other examples of the object include a dice and a figure of a character or the like.

A method according to the invention is a method for controlling a device for providing a game played using an object set that is formed by arranging objects possessed by a user, the method comprising: a step of communicating with a terminal device used by the user; and a step of displaying, on the terminal device, at least a part of objects which are selected from the plurality of the objects arranged in the object set, wherein a parameter of the object set is determined according to a parameter of an object arranged at a predetermined position in the object set.

It is desirable that the parameter includes at least one of offensive power, defensive power, hit points, rarity, and an attribute.

It is desirable that the method further comprises a step of moving objects arranged in the object set.

It is desirable that in the step of moving, the objects arranged in the object set are rotated about a specific object. In the step of moving, at least one of a moving amount and a moving direction of the objects may be determined by lot.

It is desirable that the parameter of the object set is enhanced when parameters of objects arranged in the object set are in a specific alignment.

The object set may be formed by arranging the objects on a polyhedron. In the step of moving, the objects may be moved between surfaces of the polyhedron. In the step of displaying, at least a part of the polyhedron may be displayed.

It is desirable that the objects which are selected from the plurality of the objects are arranged in a first object set or a second object set, and an object arranged in the second object set replaces an object arranged in the first object set, according to a parameter of the object arranged in the first object set.

The first object set may include at least one object that participates in the game for fighting, and the second object set may not include an object that participates in the game for fighting.

A storage medium according to the invention is a computer-readable storage medium storing a process for causing a computer to execute: providing a card game played using an object set that is formed by arranging objects possessed by a user; communicating with a terminal device used by the user; and displaying, on the terminal device, at least a part of objects which are selected from the plurality of the objects arranged in the object set, wherein a parameter of the object set is determined according to a parameter of an object arranged at a predetermined position in the object set.

A device according to the invention is a device for providing a game played using an object set that is formed by arranging objects possessed by a user, the device comprising: a communication unit for communicating with a terminal device used by the user; and a display control unit for displaying, on the terminal device, at least a part of objects which are selected from the plurality of the objects arranged in the object set, wherein a parameter of the object set is determined according to a parameter of an object arranged at a predetermined position in the object set.

A device according to the present invention is a device including means for providing a game played using an object set that is formed by arranging objects possessed by a user, the device comprising: means for communicating with a terminal device used by the user; and means for displaying, on the terminal device, at least a part of objects which are selected from the plurality of the objects arranged in the object set, wherein a parameter of the object set is determined according to a parameter of an object arranged at a predetermined position in the object set.

A method according to the invention is a method for controlling a terminal device that is capable of connecting to a device via a communication line and is operated by a user, the method comprising: a step of receiving, from the device, information necessary for a game played using an object set that is formed by arranging objects possessed by the user; and a step of displaying, on a display, at least a part of objects which are selected from the plurality of the objects arranged in the object set, wherein a parameter of the object set is determined according to a parameter of an object arranged at a predetermined position in the object set.

A system according to the invention is a system comprising: a terminal device operated by a user; and a device for providing a game played using an object set that is formed by arranging objects possessed by the user, the system comprising: a communication unit for communicating with the terminal device used by the user; and a display control unit for displaying, on the terminal device, at least a part of objects which are selected from the plurality of the objects arranged in the object set, wherein a parameter of the object set is determined according to a parameter of an object arranged at a predetermined position in the object set.

A program according to the invention may be installed or loaded into a computer, either through any of various types of storage media including an optical disc such as a CD-ROM, a magnetic disk, and a semiconductor memory or by being downloaded via a communication network or the like.

In this specification, the term "unit" does not merely mean a physical component, but includes the case where the component's function is realized by software. Moreover, one component's function may be realized by two or more physical components, and two or more components' function may be realized by one physical component.

A method according to the invention is a method for controlling a device for providing a game of fighting an enemy character, the method comprising: a step of arranging a plurality of objects according to selection by a user; and a step of executing an operation against the enemy character, by changing the arrangement of the plurality of objects. This enables strategic arrangement of a deck which is an object set.

BRIEF DESCRIPTION OF THE DRAWINGS

FIG. 4 is a diagram showing a user information table in Embodiment 1.

FIG. 5 is a diagram showing a card information table in Embodiment 1.

FIG. 6 is a diagram showing a deck information table in Embodiment 1.

DETAILED DESCRIPTION

The following describes Embodiment 1 of the invention with reference to FIGS. 1 to 18.

Figure 1:
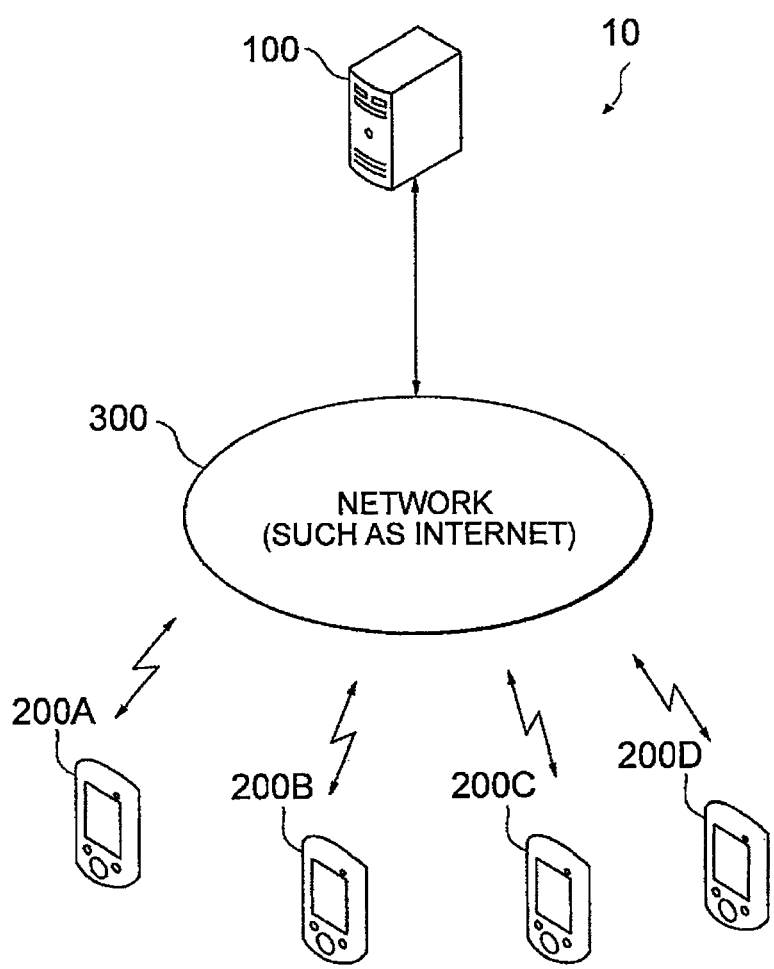
FIG. 1 is a diagram showing a structure of a game system in Embodiment 1.

FIG. 1 is a diagram showing a system structure of a game system 10 according to this embodiment. As shown in FIG. 1, the game system 10 comprises a server device 100 and mobile terminals 200A to 200D (hereafter the mobile terminals 200A to 200D are collectively referred to as "mobile terminal 200"). The server device 100 is a server computer connected to a network 300 such as the Internet or a dedicated line. The mobile terminal 200 is a terminal device wiredly or wirelessly connected to the network 300, as with the server device 100. The server device 100 and the mobile terminal 200 are set to be capable of communicating with each other, thus constituting the game system 10. Though this embodiment describes the case where the game system 10 comprises the server device 100 and the mobile terminal 200, the invention is not limited to such. As an example, the game system 10 may be configured as a cloud computing system. In this case, a user uses the computer process of the game system 10 via the network, as a service. As another example, the game system 10 may be configured as a system comprising an ASP server.

An overview of the game system 10 is described first, taking a game using cards as an example. In this example, each card is assigned an item, a character, or the like used in the game.

The user of the game system 10 is provided with the game, by connecting to the server device 100 using the mobile terminal 200 connected to the network 300. When connected to the server device 100, the user fights in the game using his or her cards. Though this embodiment describes the case where the user fights an enemy character (e.g. monster) provided by the game system 10, the user may fight another user. The fight is made up of an offensive turn in which the user attacks using the cards and a defensive turn in which the user defends against an attack by the opponent or the enemy character. As a general rule, the offensive turn and the defensive turn alternate repeatedly.

There is a plurality of types of cards used in the fight. For example, when the player operated by the user battles with the enemy character in the game, a skill increase card for increasing the player's offensive power, defensive power, or hit points, a recovery card for recovering the player's hit points, an offensive card for attacking the enemy character, a defensive card for defending against an attack by the enemy character, and the like may be used. Moreover, it is desirable that each card has an attribute such as fire, water, or thunder indicating the chemistry with the enemy character, as a parameter. As an example, when the attribute of the enemy character is fire, an offensive card whose attribute is water may be used as effective means of attack. The parameter of each card is not limited to the attribute, and may be offensive power, defensive power, hit points, rarity, and the like. For instance, the rarity is desirably ranked according to the rarity value of the item.

The user forms a set of cards, using his or her cards. The set of cards is referred to as "deck". Before the fight, the user determines the arrangement of the cards, and creates the deck. It is desirable that the deck as a whole has one parameter for each of offensive power, defensive power, hit points, attribute, and the like. It may be assumed that the user loses the fight when the hit points of the whole deck reaches 0, or loses the fight when the hit points of one of the cards in the deck reaches 0.

Figure 2:
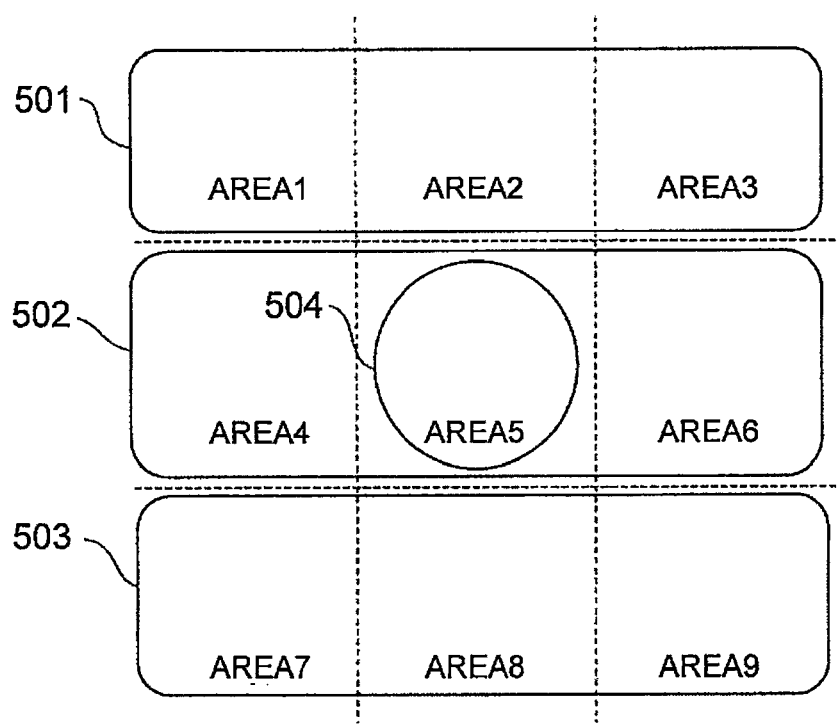
FIG. 2 is a diagram schematically showing areas in a deck in Embodiment 1.

Locations in the deck where the cards are arranged are each referred to as "area". The user arranges one card in each area, thus forming the deck. The arrangement of the areas can be arbitrarily set by a system administrator for each game. For example, the areas may be arranged in a pyramid or a matrix. In this embodiment, the areas are arranged in a matrix of three rows and three columns, as shown in FIG. 2.

The parameter of the deck is determined based on the parameter of each card arranged in one or more predetermined areas in the deck. In the example in FIG. 2, the offensive power of the deck is determined based on the offensive power-related parameters of cards arranged in a first row 501 (areas 1 to 3). The hit points of the deck is determined based on the hit points-related parameters of cards arranged in a middle row 502 (areas 4 to 6). The defensive power of the deck is determined based on the defensive power-related parameters of cards arranged in a last row 503 (areas 7 to 9). Furthermore, the attribute of the deck may be determined based on the attribute-related parameter of a card arranged in a center 504. In detail, the total offensive power of the cards in the first row 501 is the offensive power of the deck. The total defensive power of the cards in the last row 503 is the defensive power of the deck. The total hit points of the cards in the middle row 502 is the hit points of the deck. The attribute of the card in the center area 5 is the attribute of the deck.

It is desirable that the parameter of the deck is enhanced when the parameters of the cards in the deck are in a specific alignment. For instance, in the case where the attributes of the three cards arranged in the first row 501 match in the example in FIG. 2, a special attack relating to the attribute may be enabled. The special attack is an attack higher in offensive power than a normal attack. Moreover, the offensive power of the deck may be increased when the offensive power of the cards arranged in the first row 501 is greater than or equal to a predetermined value.

Each card is assigned a role in the fight by an organizing unit 111B described later, according to its area in the deck. The role is desirably determined based on the parameter of the deck influenced by the card. For example, in FIG. 2, the cards arranged in the areas 1 to 3 may be assigned the role of "offense" because the cards influence the offensive power of the deck.

The mobile terminal 200 is an information processing device having a function of communicating with the server device 100 via the network 300. In detail, the mobile terminal 200 is a mobile phone, a smartphone, a notebook PC, a PDA, or the like. The mobile terminal 200 preferably comprises a main control unit comprising a CPU and a memory, a communication unit for connecting to the network 300, an input unit such as a touch panel for receiving an operation from the user, a display unit for displaying the cards and the deck, and the like, though not shown in FIG. 1. Though this embodiment describes the case where the terminal used by the user to access the server device 100 is the mobile terminal 200, the present invention is not limited to such, and the terminal may be a non-portable terminal device such as a desktop PC.

Figure 3:
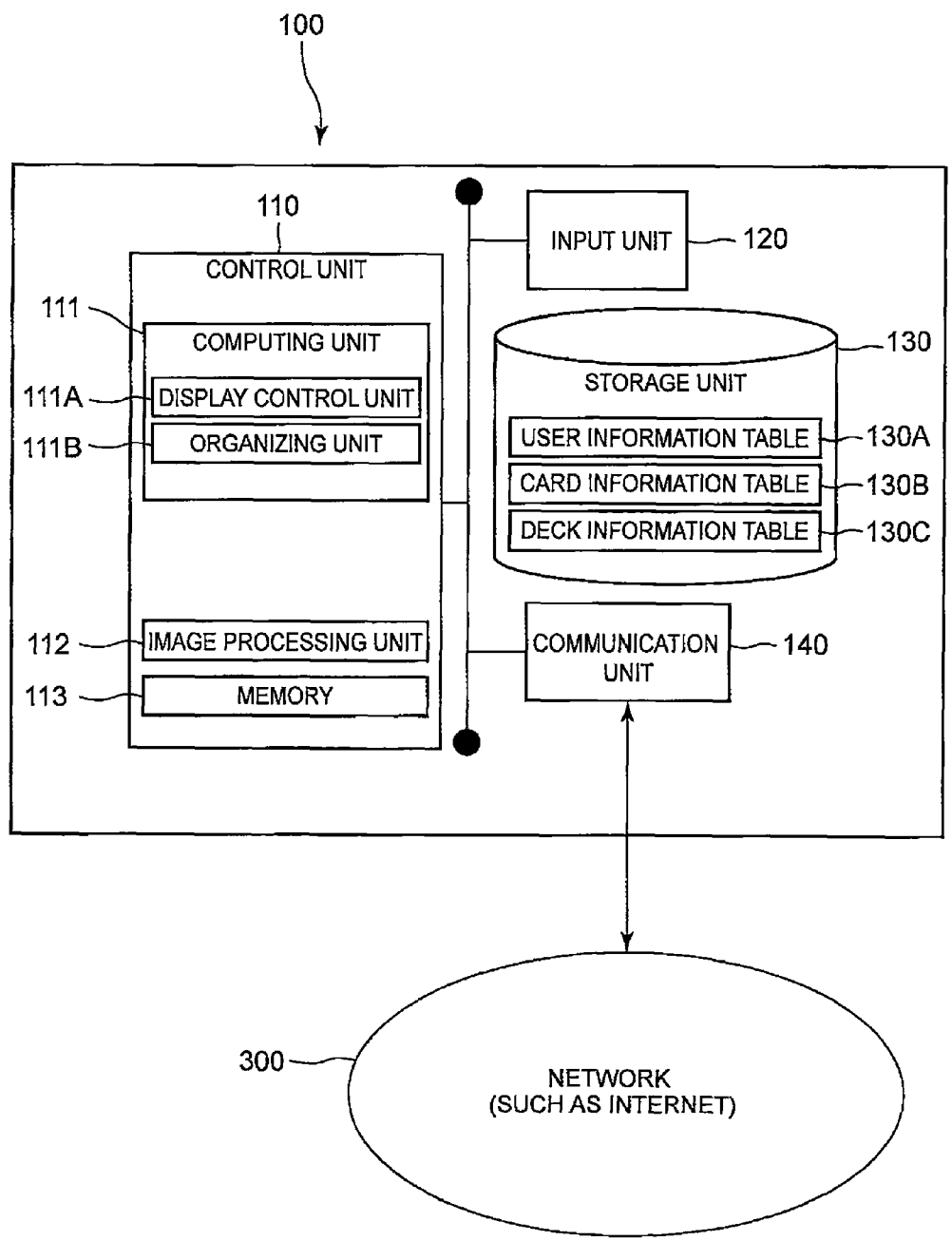
FIG. 3 is a block diagram of a server device included in the game system in Embodiment 1.

The following describes each component of the server device 100 with reference to FIG. 3. FIG. 3 is a block diagram of the server device 100. As shown in FIG. 3, the server device 100 comprises a control unit 110, an input unit 120, a storage unit 130, and a communication unit 140.

The control unit 110 comprises a computing unit 111 such as a CPU or an MPU, an image processing unit 112, and a memory 113 such as a RAM. The computing unit 111 operates various functional units, by executing programs stored in the storage unit 130 based on various inputs. The programs stored in a storage medium such as a CD-ROM or distributed via the network 300 may be installed in the computer. The memory 113 is used for temporarily storing a server program, a game program, and various data necessary for computation and the like during the execution of processes in these programs.

The image processing unit 112 creates an image to be transmitted to the mobile terminal 200 of the user. Specific examples of the image created by the image processing unit 112 include a card image, a deck image, and an enemy character image.

The input unit 120 comprises a keyboard, a mouse, a touch panel, or the like, and receives an operation from the administrator of the server device 100.

The storage unit 130 comprises a storage device such as a hard disk, and stores various programs necessary for the execution of processes in the control unit 110, data necessary for the execution of various programs, and the like. In detail, the storage unit 130 desirably holds a user information table 130A, a card information table 130B, and a deck information table 130C. FIG. 4 is a diagram showing the user information table 130A. FIG. 5 is a diagram showing the card information table 130B. FIG. 6 is a diagram showing the deck information table 130C.

For example, the user information table 130A includes user information such as user IDs, passwords, and users' game history (level, status, acquired item, play time, etc.), as shown in FIG. 4. The card information table 130B includes card IDs and parameters (attribute, offensive power, defensive power, hit points, etc.) of each card, as shown in FIG. 5. The deck information table 130C includes deck IDs, user IDs of users creating the respective decks, and an ID of a card included in each deck for each initial area arranged by the user, as shown in FIG. 6.

The communication unit 140 connects the server device 100 to the network 300. For example, the communication unit 140 may comprise: a LAN card, an analog modem, an ISDN modem, or the like; and an interface for connecting it to the processing units via a transmission path such as a system bus.

The computing unit 111 includes a display control unit 111A and an organizing unit 111B as functional units, as shown in FIG. 3.

The display control unit 111A arranges the plurality of cards in the areas according to selection by the user, and controls the mobile terminal 200 to display the image created by the image processing unit 112. In detail, the display control unit 111A stores the correspondence relations between areas and cards selected by the user, in the deck information table 130C as the initial values of the cards. The display control unit 111A may refer to the initial values and the correspondence relations stored in the memory by the organizing unit, and indicate the card-area correspondence to the image processing unit 112 to create the deck image. It is desirable that the display control unit 111A performs control so that at least a part of the cards arranged in the deck is hidden on the mobile terminal 200. By providing one or more hidden areas in the deck and preventing any card included in the hidden areas from participating in the fight, more strategic characteristics are attached to the arrangement of the deck.

The organizing unit 111B moves, i.e. changes the positions of, the cards arranged in the deck stored in the deck information table 130C. In detail, card IDs corresponding to initial positions 1 to 9 are stored in the first record in FIG. 6. In the initial state, the card corresponding to the initial position 1 corresponds to the area 1 in the deck, the card corresponding to the initial position 2 corresponds to the area 2 in the deck, the card corresponding to the initial position 3 corresponds to the area 3 in the deck, the card corresponding to the initial position 4 corresponds to the area 4 in the deck, the card corresponding to the initial position 5 corresponds to the area 5 in the deck, the card corresponding to the initial position 6 corresponds to the area 6 in the deck, the card corresponding to the initial position 7 corresponds to the area 7 in the deck, the card corresponding to the initial position 8 corresponds to the area 8 in the deck, and the card corresponding to the initial position 9 corresponds to the area 9 in the deck. These correspondence relations may be stored in the memory 113.

The organizing unit 111B may move the cards to other areas, upon each offensive turn. For example, the deck can be rotated in a predetermined direction about the card in the area 5, by moving the card in the area 1 to the area 2, the card in the area 2 to the area 3, the card in the area 3 to the area 6, the card in the area 6 to the area 9, the card in the area 9 to the area 8, the card in the area 8 to the area 7, the card in the area 7 to the area 4, and the card in the area 4 to the area 1. The rotation direction may be any of clockwise and counterclockwise, and may be determined by lot.

The organizing unit 111B also determines the role of each card according to the area, and executes action against the enemy character. The organizing unit 111B further determines the parameter of the deck according to the parameter of each card arranged in one or more predetermined areas.

Specific examples of the deck arrangement, the card movement, the deck parameter, and the card arrangement are described below, with reference to FIGS. 7 to 14. FIGS. 7 to 14 show examples of patterns of the deck arrangement and the card movement. Note that the structure of each example is not limited to the illustrated combination, and replacement, addition, and deletion may be made according to need. Though the deck is formed by arranging cards in three rows and three columns in the following examples, the invention is not limited to such, and the number of cards arranged and the shape in which the cards are arranged may be arbitrarily designed.

Figure 7:
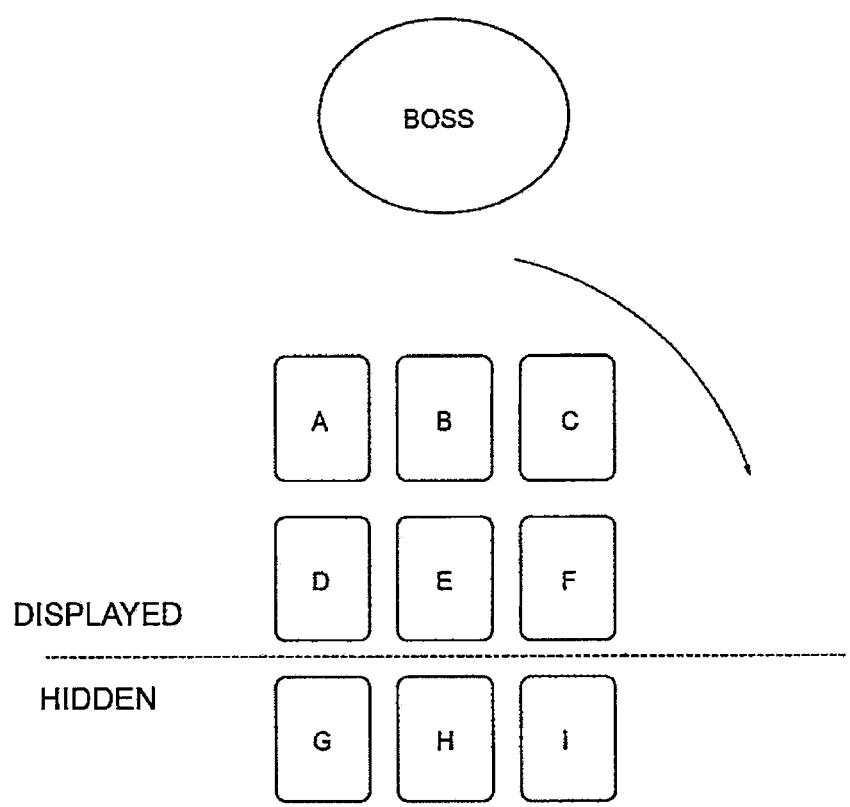
FIG. 7 is a diagram schematically showing a deck in Embodiment 1.

In the example in FIG. 7, the display control unit 111A controls the mobile terminal 200 to display cards A to F in the first two rows. Meanwhile, the display control unit 111A controls the mobile terminal 200 to hide cards G to I in the last row. In this example, the offensive power, defensive power, and hit points of the deck are respectively determined as the total offensive power, total defensive power, and total hit points of the cards A to F displayed on the mobile terminal 200, while the parameters of the hidden cards G to I do not influence the offensive power and the like of the deck. In this example, the organizing unit 111B rotates the cards in the deck clockwise about the card E by one area upon each offensive turn of the user, as shown in FIG. 7.

Figure 8:
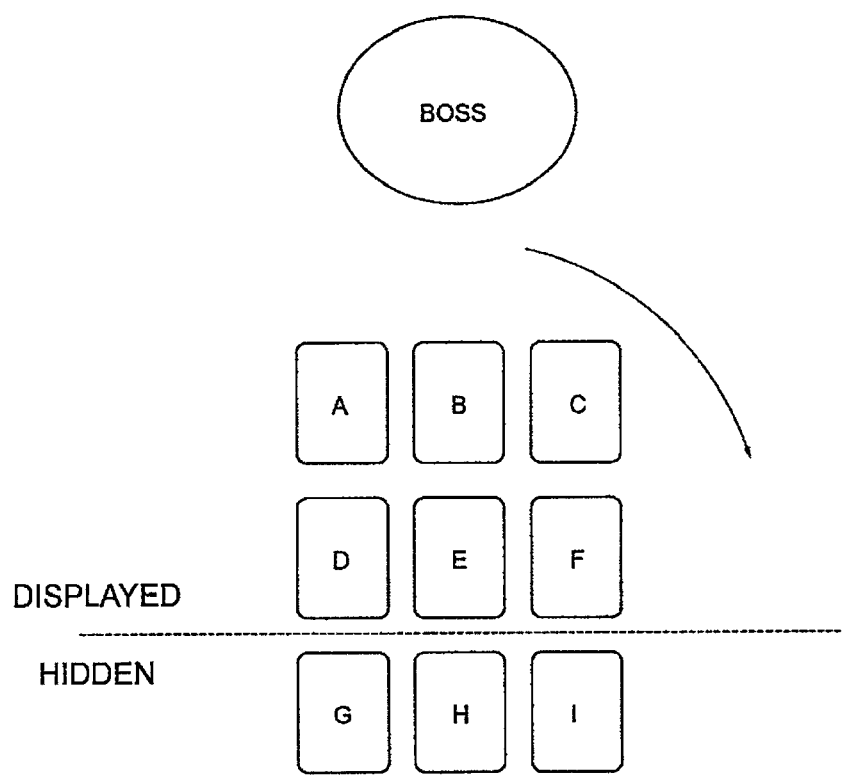
FIG. 8 is a diagram schematically showing a deck in Embodiment 1.

In the example in FIG. 8, the display control unit 111A controls the mobile terminal 200 to display the cards A to F in the first two rows, and hide the cards G to I in the last row. The offensive power of the deck may be the total offensive power of the cards A to F displayed on the mobile terminal 200, the defensive power of the deck be the total defensive power of the hidden cards G to I, and the hit points of the deck be the total hit points of all cards in the deck. In this example, the organizing unit 111B rotates the cards in the deck clockwise about the card E by one area upon each offensive turn of the user, as shown in FIG. 8.

Figure 9:
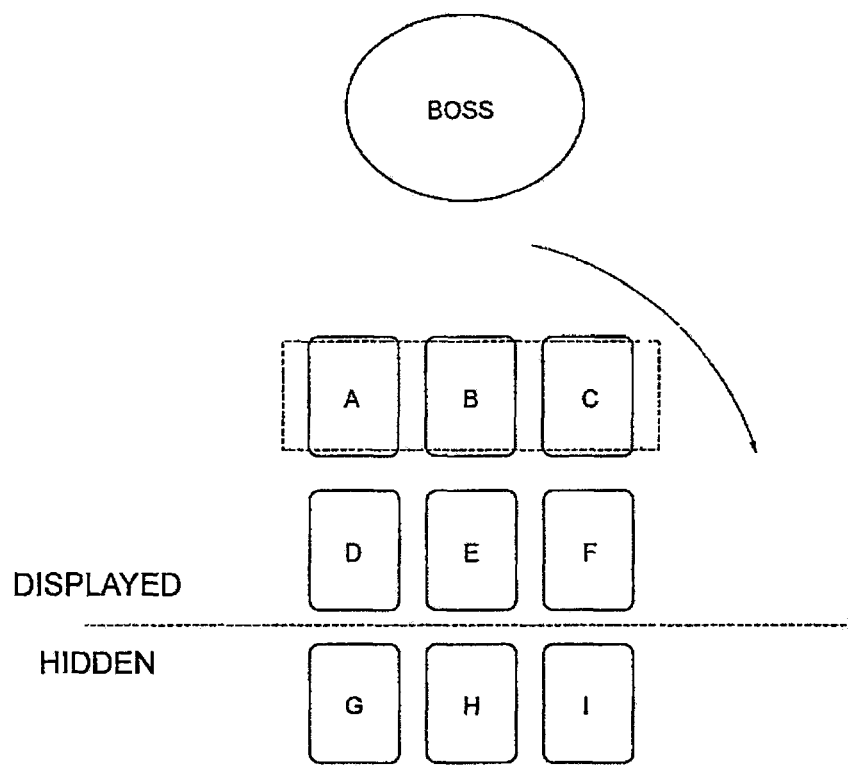
FIG. 9 is a diagram schematically showing a deck in Embodiment 1.

In the example in FIG. 9, the display control unit 111A controls the mobile terminal 200 to display the cards A to F in the first two rows, and hide the cards G to I in the last row. The offensive power of the deck is the total offensive power of the cards A to F displayed on the mobile terminal 200, the defensive power of the deck is the total defensive power of the hidden cards G to I, and the hit points of the deck is the total hit points of all cards in the deck. In this example, the organizing unit 111B rotates the cards in the deck clockwise about the card E by one area upon each offensive turn of the user, as shown in FIG. 9. Moreover, in this example, a special attack (a special attack against the boss by summoning a monster) is desirably enabled in the case where the attributes of the cards arranged in the first row (the row of A, B, and C) match. Though the special attack is enabled in the case where the attributes of the cards arranged in the first row match in this example, the special attack may also be enabled in the case where the attributes of the cards arranged in the middle row match or the attributes of the cards arranged in the last row match. In addition, the special attack may be enabled in the case where the attributes of the cards arranged in the left column match, the attributes of the cards arranged in the middle column (the column of B, E, and H) match, or the attributes of the cards arranged in the right column match.

The enabled feature is not limited to the special attack, and may be a special operation. For example, in the case where the attributes of the cards arranged in the first row match, the total offensive power of the cards in the first row is calculated, and extra 20% offensive power of the calculated total offensive power is added (increase of offensive power). In the case where the attributes of the cards arranged in the middle row match, the total hit points of the cards in the middle row is calculated, and extra 20% hit points of the calculated total hit points is added (recovery of hit points). In the case where the attributes of the cards arranged in the last row match, the total defensive power of the cards in the last row is calculated, and extra 20% defensive power of the calculated total defensive power is added (increase of defensive power).

Figure 10:
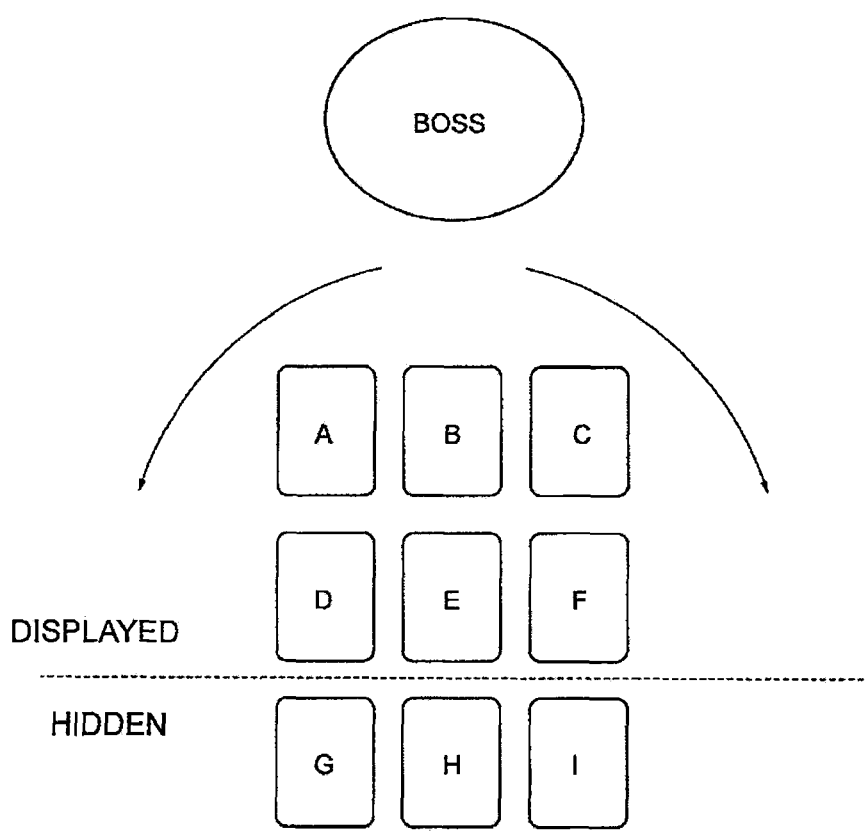
FIG. 10 is a diagram schematically showing a deck in Embodiment 1.

In the example in FIG. 10, the display control unit 111A controls the mobile terminal 200 to display the cards A to F in the first two rows, and hide the cards G to I in the last row. The offensive power, defensive power, and hit points of the deck may be respectively the total offensive power, total defensive power, and total hit points of the cards A to F displayed on the mobile terminal 200. In this example, the organizing unit 111B rotates the cards in the deck about the card E by one area upon each offensive turn of the user, as shown in FIG. 10. The rotation direction is desirably determined by lot upon each offensive turn.

Figure 11:
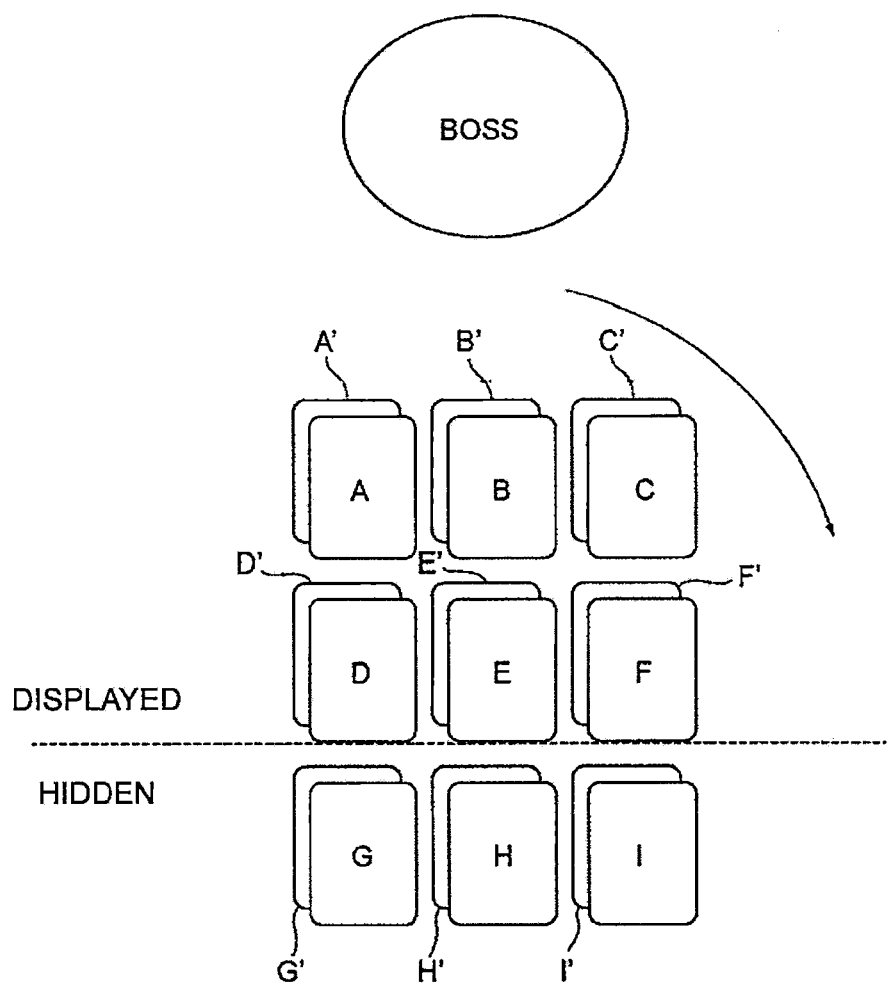
FIG. 11 is a diagram schematically showing a deck in Embodiment 1.

In the example in FIG. 11, the deck is formed by arranging cards in three rows and three columns in an overlapped manner at the top and bottom. The display control unit 111A controls the mobile terminal 200 to display the cards A to F in the first two rows and hide the cards G to I in the last row at the top. The display control unit 111A also controls the mobile terminal 200 to display, behind the cards A to F, cards A' to F' in the first two rows and hide cards G' to I' in the last row at the bottom. The offensive power, defensive power, and hit points of the deck may be respectively the total offensive power, total defensive power, and total hit points of the displayed cards A to F. In this example, the organizing unit 111B rotates the cards at both the top and bottom of the deck clockwise about the card E by one area upon each offensive turn of the user, as shown in FIG. 11. In this example, in the case where the hit points of any top card reaches 0, the top card is replaced with the bottom card arranged at the same position.

Figure 12:
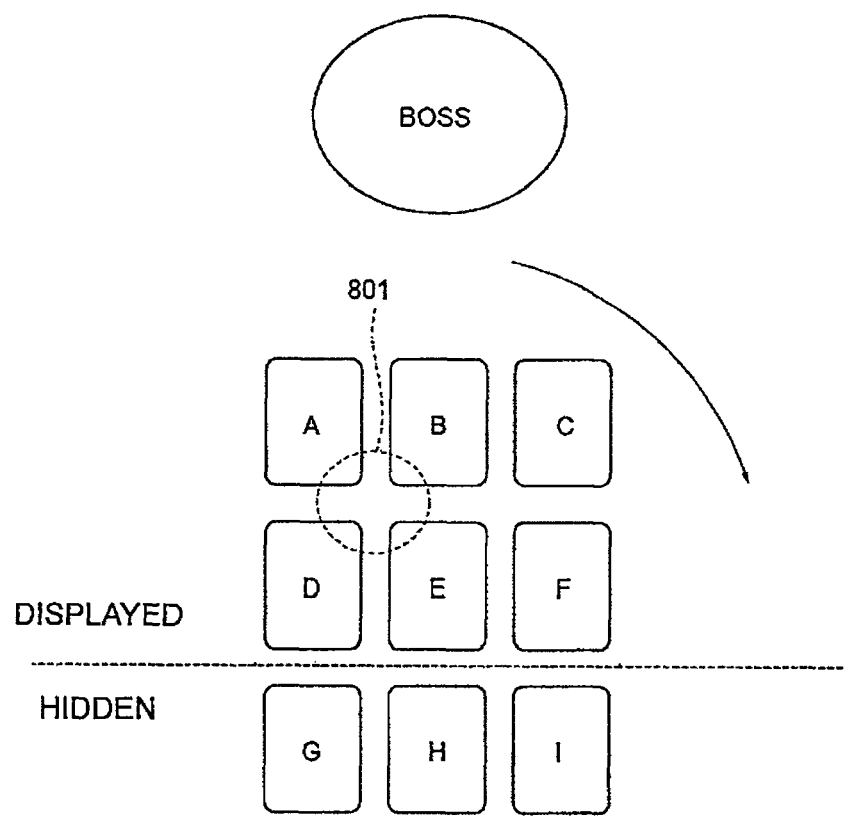
FIG. 12 is a diagram schematically showing a deck in Embodiment 1.

In the example in FIG. 12, the display control unit 111A controls the mobile terminal 200 to display the cards A to F in the first two rows, and hide the cards G to I in the last row. The offensive power, defensive power, and hit points of the deck may be respectively the total offensive power, total defensive power, and total hit points of the cards A to F displayed on the mobile terminal 200. In this example, the organizing unit 111B can rotate the deck clockwise, and also partially rotate the displayed cards A to F, as shown in FIG. 12. For instance, the cards A, B, E, and D may be rotated clockwise about a point 801 by one area. Such partial rotation may be enabled by performing the special attack.

Figure 13:
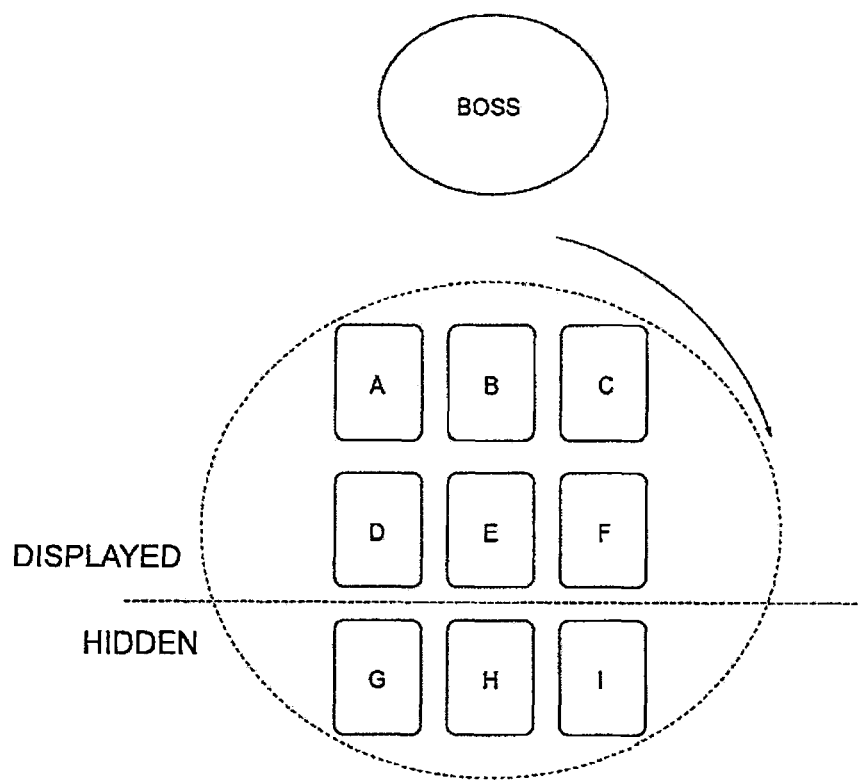
FIG. 13 is a diagram schematically showing a deck in Embodiment 1.

In the example in FIG. 13, the display control unit 111A controls the mobile terminal 200 to display the cards A to F in the first two rows, and hide the cards G to I in the last row. The offensive power, defensive power, and hit points of the deck may be respectively the total offensive power, total defensive power, and total hit points of the cards A to F displayed on the mobile terminal 200. In this example, the organizing unit 111B determines the rotation direction and rotation speed of the deck according to an operation by the user, as shown in FIG. 13. For instance, in the case where the mobile terminal 200 includes a touch panel, the rotation direction or the rotation speed may be changed according to the direction and strength of the user's operation (hereafter referred to as "flick operation") of sliding his or her finger on the touch panel.

Figure 14:
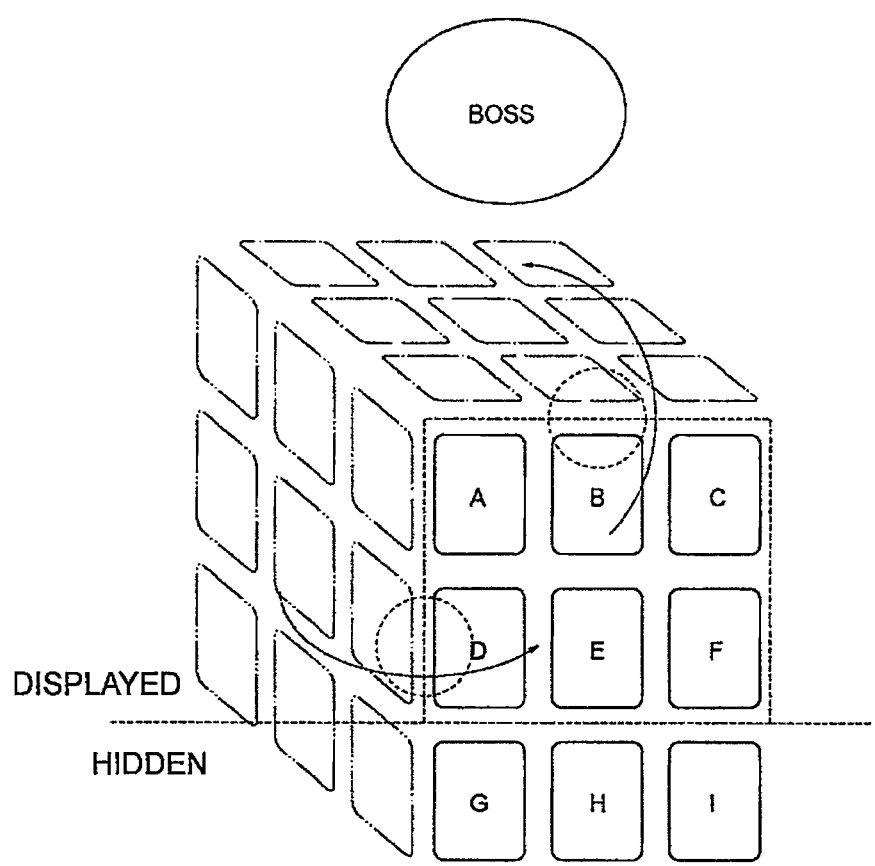
FIG. 14 is a diagram schematically showing a deck in Embodiment 1.

In the example in FIG. 14, the deck is formed by stereoscopically arranging cards in three rows and three columns on each of six surfaces that are a front surface, four side surfaces, and a top surface. The display control unit 111A controls the mobile terminal 200 to display the cards A to F in the first two rows and hide the cards G to I in the last row on the front surface. The display control unit 111A also controls the mobile terminal 200 to hide the cards on the side surfaces and the top surface. The offensive power, defensive power, and hit points of the deck may be respectively the total offensive power, total defensive power, and total hit points of the cards A to F displayed on the mobile terminal 200. In this example, the organizing unit 111B can move cards in adjacent rows and columns between surfaces upon each offensive turn of the user, as shown in FIG. 14. The special attack is desirably enabled in the case where the attributes of the cards match on any surface.

Figure 15:
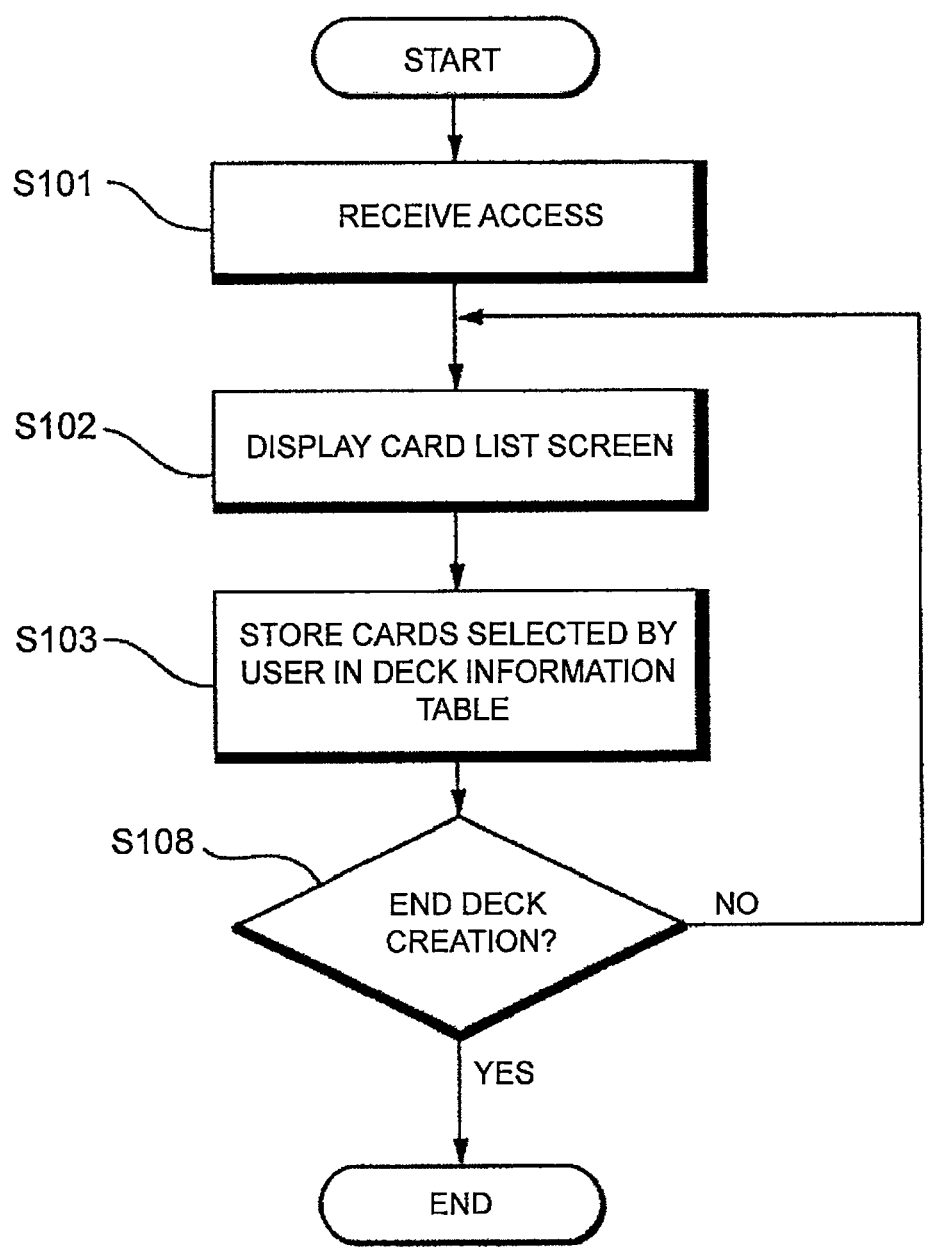
FIG. 15 is a chart showing flow of a deck creation process in Embodiment 1.
Figure 16:
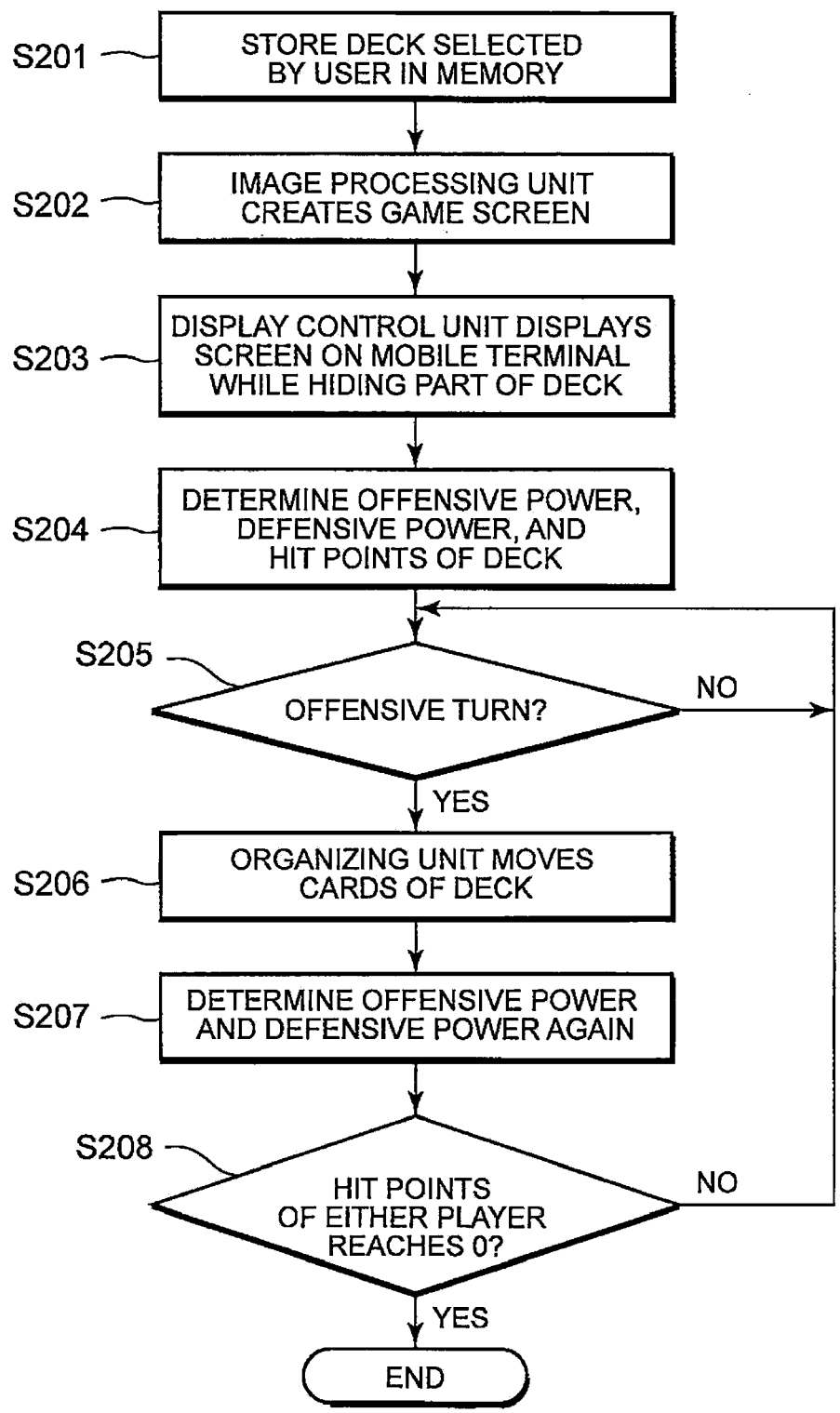
FIG. 16 is a chart showing process flow of the game system in Embodiment 1.

The following describes process flow of the server device 100, with reference to FIGS. 15 and 16. Note that process steps included in the process flow described below may be arbitrarily executed in different order or in parallel and also another step may be added between the process steps, without causing contradiction in the processes. Besides, one step so described for convenience may be executed separately in a plurality of steps, and a plurality of steps so described for convenience may be executed as one step.

FIG. 15 is a flowchart showing deck creation process flow of the server device 100. First, the server device 100 receives access from the user using the mobile terminal 200A (S101). A game start request is transmitted from the mobile terminal 200A to the computing unit 111. It is desirable that, before starting the game, the server device 100 requests input of login information such as a user ID and a password. Having recognized the login information, the computing unit 111 in the server device 100 acquires user-specific history information associated with the user ID from the user information table 130A in the storage unit 130, and allows the user to resume the game from where the user left last time.

When the server device 100 receives the game start request from the user, the image processing unit 112 displays a list screen of cards possessed by the user (S102). It is desirable that not only the image of each card but also the parameter of each card, the number of cards acquired, and the like are displayed in the list screen. This enables the user to form the deck based on the parameter of each card.

When the user selects nine cards which he or she wants to arrange in the deck from the card list screen and determines the arrangement area of each card in the deck, the computing unit 111 stores these information in the deck information table 130C (S103).

The computing unit 111 then displays an inquiry of whether or not to create another deck, on the mobile terminal 200A. When the user selects "not create", the deck creation process ends.

FIG. 16 is a flowchart showing fighting process flow of the server device 100.

First, when the user selects a deck used in the fight, the computing unit 111 stores the selected deck in the memory 113 (S201). The user can select an appropriate deck, according to the attribute or parameter of an enemy character as the opponent.

Figure 17:
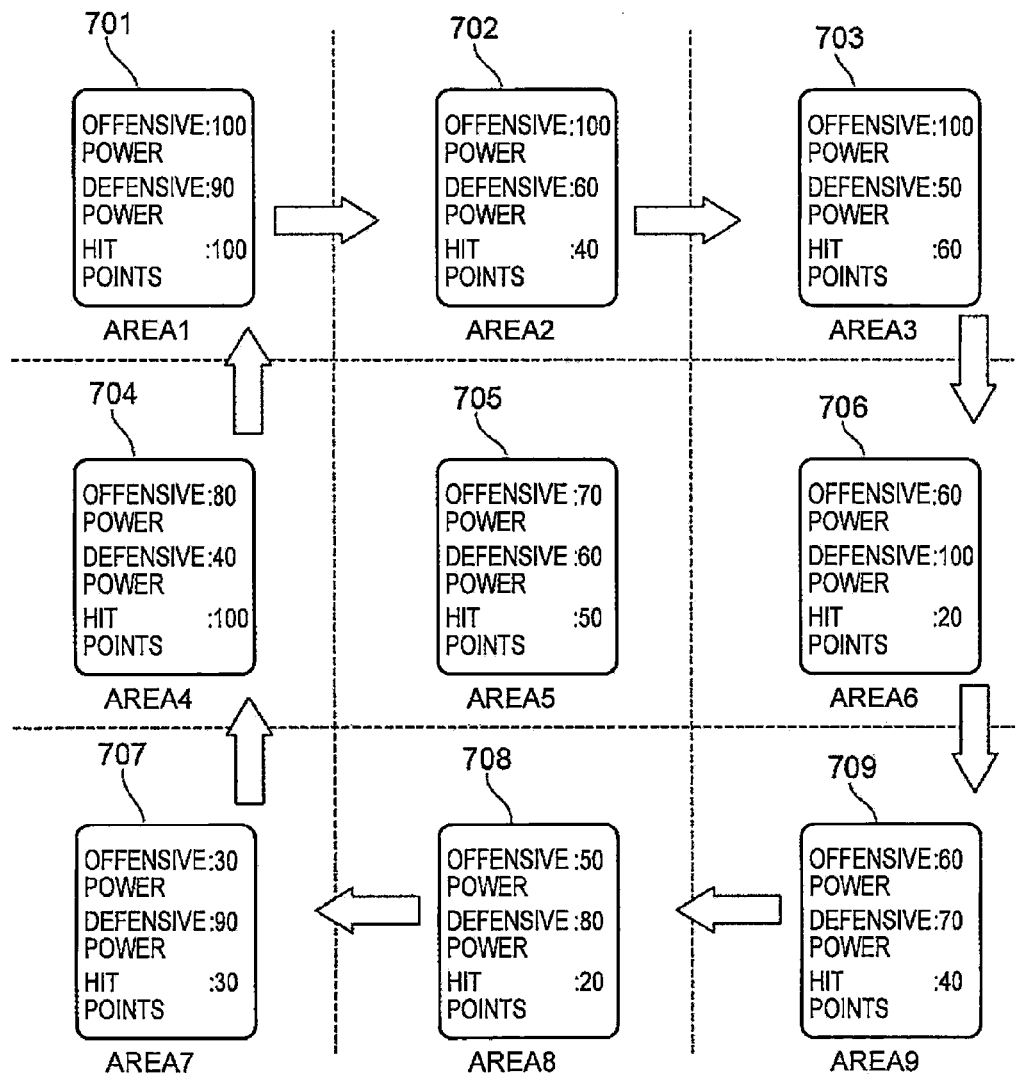
FIG. 17 is a diagram schematically showing a deck in Embodiment 1.
Figure 18:
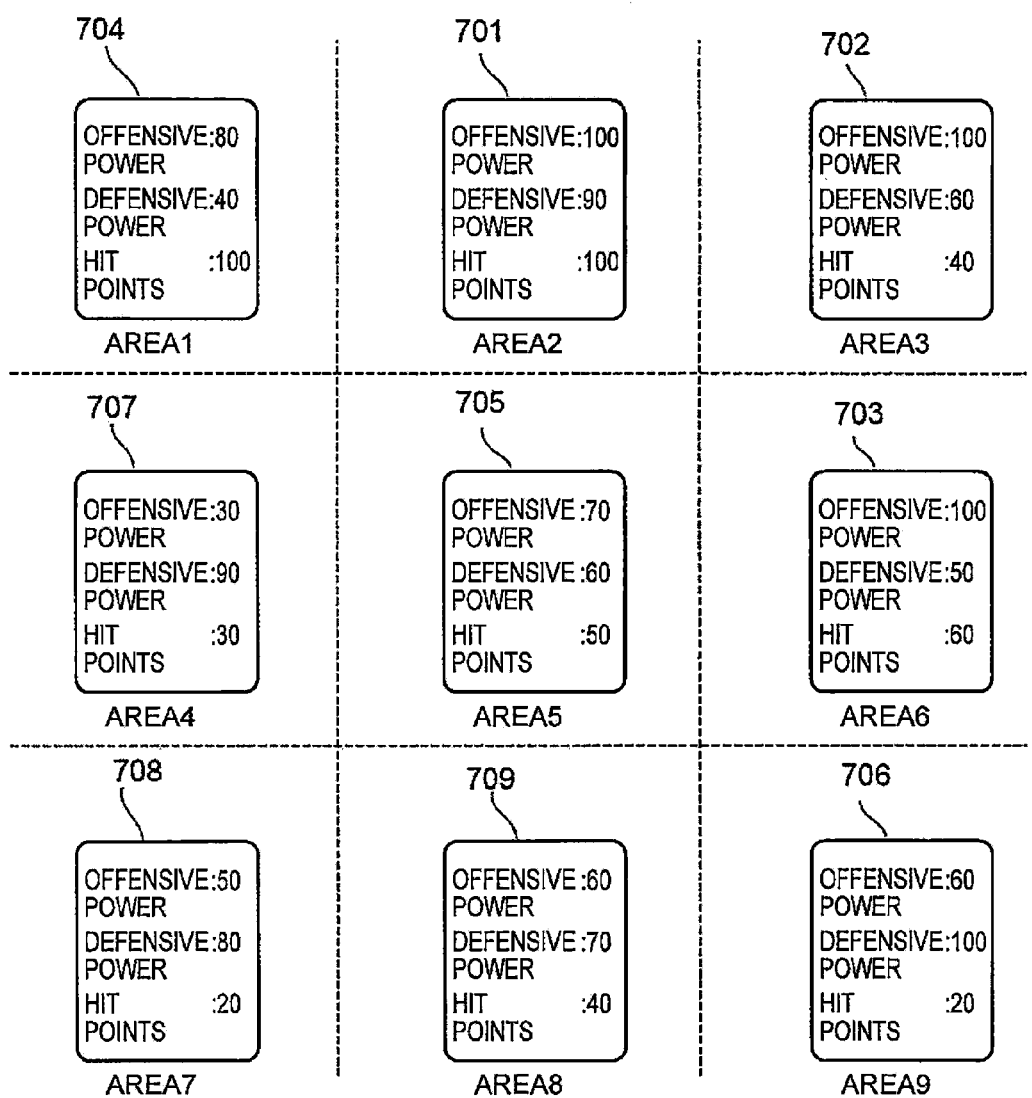
FIG. 18 is a diagram schematically showing a deck in Embodiment 1.

When the fight starts, the display control unit 111A refers to the deck information table 130C and the memory, and recognizes the initial position of each card in the selected deck. The display control unit 111A instructs the image processing unit 112 to create the image of the deck, based on the recognized initial position. According to the instruction from the display control unit 111A, the image processing unit 112 creates the image of the deck and the game screen in which the deck is displayed (S202). The display control unit 111A displays the created game screen on the screen of the mobile terminal 200A. The display control unit 111A hides a part of the deck (S203). FIGS. 17 and 18 each show an example of the deck used in the fight. FIG. 17 shows the card arrangement in the initial state, whereas FIG. 18 shows the card arrangement after rotating the deck. The display control unit 111A controls the mobile terminal 200A to display the cards arranged in the areas 1 to 6 but hide the cards arranged in the areas 7 to 9 in FIG. 17.

Next, the organizing unit 111B determines the offensive power, defensive power, and hit points of the deck, from the parameter of each card stored in the deck information table 130C (S204). For example, the offensive power of the deck may be the total offensive power of the cards arranged in the areas 1 to 3, the defensive power of the deck be the total defensive power of the cards arranged in the areas 4 to 6, and the hit points of the deck be the total hit points of all cards arranged in the deck. In the example in FIG. 17, the offensive power of the deck is 300 which is the total offensive power of cards 701, 702, and 703, the defensive power of the deck is 200 which is the total defensive power of cards 704, 705, and 706, and the hit points of the deck is 460 which is the total hit points of cards 701 to 709. Moreover, the attribute of the deck is the attribute of the card arranged in the area 5 at the center of the deck. The organizing unit 111B further determines the role of each card according to the arrangement area. In the example in FIG. 17, the cards 701 to 703 are assigned the role of offense, and the cards 704 to 706 are assigned the role of defense. The organizing unit 111B executes action based on the determined role of each card. For instance, in an offensive turn, the organizing unit 111B causes the cards (cards 701 to 703)

assigned the role of offense to attack the enemy character. In a defensive turn, the organizing unit 111B causes the cards (cards 704 to 706) assigned the role of defense to defend against an attack by the enemy character.

Upon determining that an offensive turn starts (S205: YES), the organizing unit 111B moves each card (S206). In the example in FIG. 18, the cards are moved clockwise about the card 705 in the area 5, by one area. Having moved the cards in the deck, the organizing unit 111B determines the offensive power and defensive power of the deck again (S207). In this example, the offensive power of the deck after the movement is 280 which is the total offensive power of the cards 704, 701, and 702, and the defensive power of the deck after the movement is 200 which is the total defensive power of the cards 707, 705, and 703. The organizing unit 111B also assigns the role of offense to the cards 704, 701, and 702.

The process of S205 to S207 is repeatedly executed until the hit points of the deck of either player reaches 0 and the fight ends.

Thus, the user can strategically arrange the deck, by changing the arrangement of the cards in the deck between the displayed areas and the hidden areas.

OTHER EMBODIMENTS

Though an embodiment of the invention has been described above, the invention is not limited to the foregoing embodiment, and various modifications and changes are possible based on the technical idea of the invention.

For example, in the foregoing embodiment, the mobile terminal 200 directly accesses the server device 100 via the network 300. However, in the case where the communication system includes a Web server, the communication with the mobile terminal 200 may be relayed by the Web server. This contributes to lower security risk.

DESCRIPTION OF REFERENCE NUMERALS 10 game system
100 server device
110 control unit
111 computing unit
111A display control unit
111B organizing unit
112 image processing unit
113 memory
120 input unit
130 storage unit
130A user information table
130B card information table
130C deck information table
140 communication unit
200A to 200D mobile terminal
300 network
501 to 503 row
504 area
701 to 709 card
areas 1 to 9 area
cards A to I card
cards A' to I' card

What is claimed is:

1. A game control method executed by a game control device for providing a game to a plurality of communication terminals respectively used by a plurality of users, the game control device communicating with the communication terminals and having a storage, the method comprising:

storing a plurality of objects possessed by a user, each in association with at least one of the parameters of offensive power, defensive power, hit points or an attribute in the storage;
storing an object set by arranging the plurality of the objects possessed by the user in a plurality of predetermined areas;
displaying, on a communication terminal used by the user, at least a portion of the plurality of the objects arranged in the object set;
determining a parameter for the object set, according to a parameter of an object arranged at a predetermined position in the object set;
executing battle actions using the parameters of the object set; and
automatically changing a position of an object facing an opponent, arranged in the object set, by rotating the object set about a specific object to cause the parameters of the object set and a turn of the battle actions to change.

2. The method according to claim 1, wherein in the step of changing, at least one of a moving amount and a moving direction of the objects is determined by lot.

3. The method according to claim 1, wherein the parameter of the object set is enhanced when parameters of objects arranged in the object set are in a specific alignment.

4. The method according to claim 1, wherein the object set is set by arranging the objects on a polyhedron,
wherein in the step of changing, the objects are moved between surfaces of the polyhedron, and
wherein in the step of displaying, at least a part of the polyhedron is displayed.

5. The method according to claim 1, wherein the objects which are displayed on the communication terminal are arranged in a first object set or a second object set, and
wherein an object arranged in the second object set replaces an object arranged in the first object set, according to a parameter of the object arranged in the first object set.

6. The method according to claim 5, wherein the first object set includes at least one object that participates in the game for executing battle actions, and
wherein the second object set does not include an object that participates in the game for executing battle actions.

7. A computer-readable storage medium storing a computer program, wherein the computer program causes a game control device for providing a game to a plurality of communication terminals respectively used by a plurality of users, the game control device communicating with the communication terminals and having a storage, to execute a process, the process comprising:

storing a plurality of objects possessed by a user each in association with at least one of the parameters of offensive power, defensive power, hit points or an attribute in the storage;
storing an object set by arranging the plurality of the objects possessed by the user in a plurality of predetermined areas;
displaying, on a communication terminal used by the user, at least a portion of the plurality of the objects arranged in the object set;
determining a parameter of the object set, according to the parameter of the object arranged at a predetermined position in the object set;
executing battle actions using the parameters of the object set; and automatically changing a position of an object facing an opponent, arranged in the object set, by rotating the object set about a specific object to cause the parameters of the object set and a turn of the battle actions to change.

8. A game control device for providing a game to a plurality of communication terminals respectively used by a plurality of users, the game control device comprising:
- a communication module for communicating with the communication terminals; and
- a storage configured to store a plurality of objects possessed by a user each in association with at least one of the parameters of offensive power, defensive power, hit points or an attribute, and for storing an object set by arranging the plurality of the objects possessed by the user in a plurality of pre-determined areas;
- a display control module for displaying, on a communication terminal used by the user, at least a portion of the plurality of the objects arranged in the object set;
- a determining module for determining a parameter for the object set, according to a parameter of an object arranged at a predetermined position in the object set;
- a battle actions executing module for executing battle actions using the parameters of the object set; and
- a changing module for automatically changing a position of an object facing an opponent, arranged in the object set, by rotating the object set about a specific object to cause the parameters of the object set and a turn of the battle actions to change.

9. A system including: a plurality of communication terminals respectively used by a plurality of users; and a game control device for providing a game to the plurality of communication terminals, the system comprising:
- a storage configured to store a plurality of objects possessed by a user each in association with at least one of the parameters of offensive power, defensive power, hit points or an attribute, and for storing an object set by arranging the plurality of the objects possessed by the user in a plurality of pre-determined areas;
- a display control module for displaying, on a communication terminal used by the user, at least a portion of the plurality of the objects arranged in the object set;
- a determining module for determining a parameter for the object set, according to a parameter of an object arranged at a predetermined position in the object set;
- a battle actions executing module for executing battle actions using the parameters of the object set; and
- a changing module for automatically changing a position of an object facing an opponent, arranged in the object set, by rotating the object set about a specific object to cause the parameters of the object set and a turn of the battle actions to change.

\* \* \* \* \*